United States Patent
Kim et al.

(10) Patent No.: US 11,535,128 B2
(45) Date of Patent: Dec. 27, 2022

(54) VEHICLE SEAT SUPPORT ASSEMBLY

(71) Applicants: HYUNDAI MOTOR COMPANY, Seoul (KR); KIA MOTORS CORPORATION, Seoul (KR)

(72) Inventors: Mu Young Kim, Hwaseong-si (KR); Sang Do Park, Suwon-si (KR); Gil Ju Kim, Seoul (KR); Jung Sang You, Hwaseong-si (KR); Ho Suk Jung, Hwaseong-si (KR); Min Seok Kim, Hanam-si (KR); Seung Young Lee, Seoul (KR); Jun Young Yun, Osan-si (KR); Seung Hyun Kim, Daejeon (KR); Han Su Yoo, Hwaseong-si (KR); Chan Ho Jung, Gunpo-si (KR); Han Kyeol Cho, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/148,155

(22) Filed: Jan. 13, 2021

(65) Prior Publication Data
US 2022/0032829 A1   Feb. 3, 2022

(30) Foreign Application Priority Data
Jul. 29, 2020   (KR) .................. 10-2020-0094157

(51) Int. Cl.
*B60N 2/427*   (2006.01)
*B60N 2/16*   (2006.01)

(52) U.S. Cl.
CPC ......... *B60N 2/42718* (2013.01); *B60N 2/161* (2013.01)

(58) Field of Classification Search
CPC ........ B60N 2/168; B60N 2/42; B60N 2/4207; B60N 2/4221; B60N 2/4249; B60N 2/4263; B60N 2/427; B60N 2/42718; B60N 2/4727; B60N 2/42763; B60N 2/42781; B60N 2/07; B60N 2/0745; B60N 2/0742; B60N 2/161
See application file for complete search history.

(56) References Cited

U.S. PATENT DOCUMENTS

| 4,635,890 | A | * | 1/1987 | Matsuda | B60N 2/0705 248/429 |
| 5,407,166 | A | * | 4/1995 | Pilarski | B60N 2/0705 248/430 |
| 5,641,145 | A | * | 6/1997 | Droulon | B60N 2/123 248/424 |
| 6,113,185 | A | * | 9/2000 | Yamaguchi | B60N 2/4221 280/748 |

(Continued)

FOREIGN PATENT DOCUMENTS

| JP | 2010-006239 A | 1/2010 |
| JP | 2013-220784 A | 10/2013 |
| KR | 20-2011-0001405 A | 2/2011 |

*Primary Examiner* — Kyle J. Walraed-Sullivan
(74) *Attorney, Agent, or Firm* — Lempia Summerfield Katz LLC

(57) ABSTRACT

A vehicle seat support assembly includes: a front link; and a front link bracket coupled to an upper rail of a vehicle seat and including a sagging support portion configured to inhibit sagging of the front link toward the upper rail. In particular, the front link is pivotally coupled to the front link.

10 Claims, 7 Drawing Sheets

(56) References Cited

U.S. PATENT DOCUMENTS

| | | | |
|---|---|---|---|
| 6,254,181 B1* | 7/2001 | Aufrere | B60N 2/4221 297/216.1 |
| 6,648,409 B1* | 11/2003 | Laporte | B60N 2/42718 297/216.1 |
| 6,837,540 B2* | 1/2005 | Yamaguchi | B60N 2/4221 297/216.1 |
| 7,654,615 B2* | 2/2010 | Ventura | B60N 2/1615 297/344.15 |
| 10,322,808 B2* | 6/2019 | Alamgir | B60N 2/005 |
| 10,343,564 B2* | 7/2019 | Yamada | B60N 2/42709 |
| 10,988,058 B1* | 4/2021 | Bharsakale | B60N 2/3011 |
| 2004/0051353 A1* | 3/2004 | Klukowski | B60N 2/42763 297/216.1 |
| 2005/0161991 A1* | 7/2005 | Minai | B60N 2/42736 297/344.11 |
| 2006/0055214 A1* | 3/2006 | Serber | B60N 2/1846 297/216.1 |
| 2007/0120407 A1* | 5/2007 | Kojima | B60N 2/0825 297/344.11 |
| 2009/0160228 A1* | 6/2009 | Houston | B60N 2/4279 297/216.2 |
| 2011/0025106 A1* | 2/2011 | Okamoto | B60N 2/7094 297/216.1 |
| 2013/0038098 A1* | 2/2013 | Maier | B60N 2/1615 297/216.1 |
| 2013/0147241 A1* | 6/2013 | Park | B60N 2/4228 297/216.1 |
| 2013/0200675 A1* | 8/2013 | Beneker | B60N 2/0228 297/325 |
| 2015/0239373 A1* | 8/2015 | Weng | B60N 2/42772 297/216.1 |
| 2015/0375647 A1* | 12/2015 | Behrens | B60N 2/4221 297/325 |
| 2016/0107549 A1* | 4/2016 | Janicek | B60N 2/161 297/216.1 |
| 2017/0368962 A1* | 12/2017 | Auer | B60N 2/123 |
| 2018/0065509 A1* | 3/2018 | Ohashi | B60N 2/168 |
| 2018/0297533 A1* | 10/2018 | Mozurkewich | B60N 2/4263 |
| 2020/0282877 A1* | 9/2020 | Gajda | B60N 2/7017 |

* cited by examiner

VEHICLE SEAT SUPPORT ASSEMBLY

CROSS-REFERENCE TO RELATED APPLICATION

The present application claims priority to and the benefit of Korean Patent Application No. 10-2020-0094157, filed on Jul. 29, 2020, the entire contents of which are incorporated herein by reference.

FIELD

The present disclosure relates to a vehicle seat support assembly.

BACKGROUND

The statements in this section merely provide background information related to the present disclosure and may not constitute prior art.

Typically, a vehicle seat includes a lower seat part, a seatback, and a headrest. The lower seat part supports the lower body of the occupant, the seatback supports the upper body of the occupant, and the headrest supports the head of the occupant. The lower seat part, the seatback and headrest are framed by a lower seat frame, a seatback frame, and a headrest frame, respectively.

As illustrated in FIGS. 1 and 2, the seat may be movable forward and backward and may pivot in the vertical direction such that the seat can be conveniently adjusted for the physical condition or habit of the occupant. To this end, the seat includes a lower rail 1 fixedly coupled to the floor of a vehicle and an upper rail 2 slidable on the lower rail 1 and coupled to a lower seat frame 3.

A front link bracket 4 is coupled to the front side of the upper rail 2. Typically, the front link bracket 4 is formed integrally with the upper rail 2 by welding. The front link bracket 4 is connected to the lower seat frame 3 by a front link 5. The front link 5 has a pivot point Pi on the front link bracket 4 and may be pivotally movable about the pivot point Pi to move the lower seat frame 3 vertically.

Upon a frontal crash of a vehicle, force is applied downward by a dummy load to generate a submarining phenomenon, which is known to increase degree of the injury. The submarining phenomenon occurs during a frontal crash where an occupant's lower body moves forward while sinking at the same time as if a submarine was submerged. Although the occupant's upper body is restrained by the seat belt and does not move, the occupant's lower body is pushed downward and forward and is caught in the vehicle body crumpled during the crash due to the submarining phenomenon, causing serious physical injury.

A vehicle collision test confirmed that sagging occurred in the upper rail 2 and the front link 5 due to the dummy load during the frontal crash, which resulted in submarining phenomenon. As illustrated in FIG. 2, the front link 5 is subject to a downward force and sags with rotation ($C_1$ in FIG. 2). In addition, when the upper rail 2 is positioned forward than the lower rail 1, the protruded upper rail 2 sags from the tip of the lower rail 1 ($C_2$ in FIG. 2).

The foregoing is intended merely to aid in the understanding of the background of the present disclosure, and is not intended to mean that the present disclosure falls within the purview of the related art that is already known to those skilled in the art.

SUMMARY

The present disclosure provides a vehicle seat support assembly having an improved seat support structure capable of inhibiting a submarining phenomenon during a vehicle collision.

The present disclosure provides a vehicle seat support assembly capable of inhibiting sagging of a front link and sagging of an upper rail in a vehicle seat.

A vehicle seat support assembly according to one form of the present disclosure includes: a front link; and a front link bracket coupled to an upper rail of a vehicle seat and including a sagging support configured to inhibit sagging of the front link toward the upper rail, wherein the front link is pivotally coupled to the front link bracket.

In another form of the present disclosure, a vehicle seat support assembly includes: a lower rail; an upper rail slidably mounted on the lower rail, wherein the upper rail includes a first portion that has a first length and is projectable with respect to the lower rail; a front link bracket coupled to the first portion and extending along the upper rail for a distance longer than the first length; and a front link pivotally coupled to the front link bracket.

According to the present disclosure, the vehicle seat support assembly has an improved seat support structure capable of inhibiting a submarining phenomenon during a vehicle collision.

According to the present disclosure, the vehicle seat support assembly is capable of inhibiting sagging of a front link of a vehicle seat and sagging of an upper rail.

The effects of the present disclosure are not limited to those described above, and other effects not mentioned will be clearly recognized by those skilled in the art from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
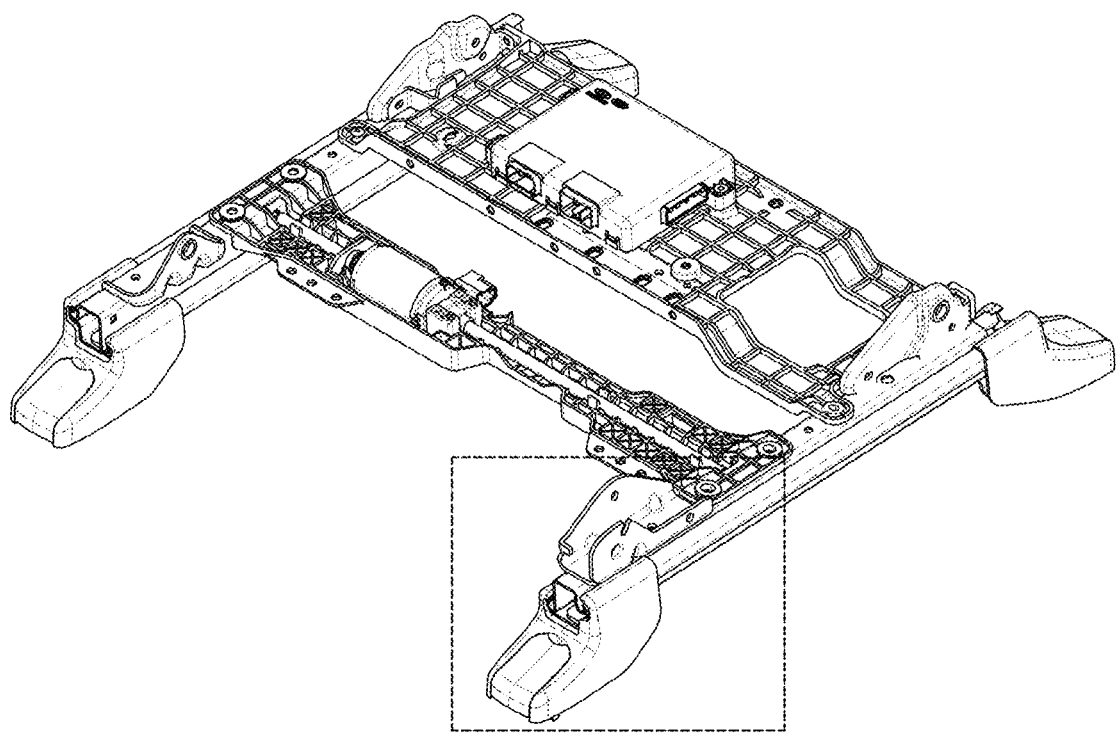
FIG. 1 illustrates a vehicle seat support assembly.
Figure 2:
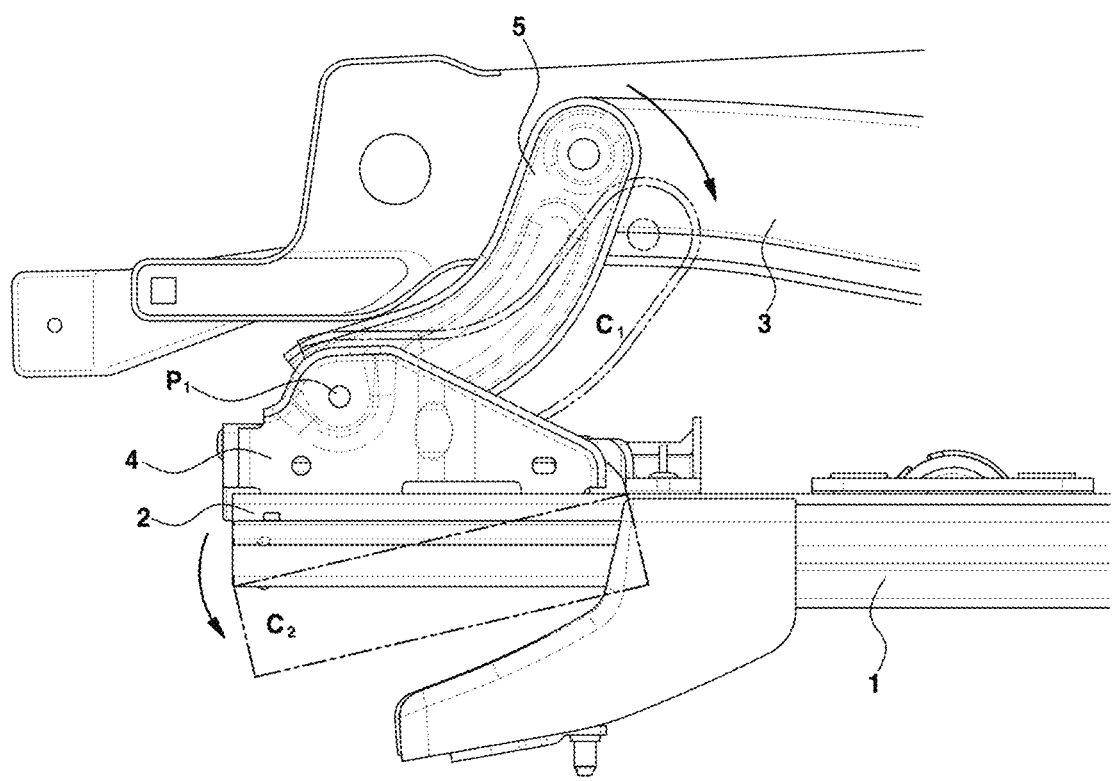
FIG. 2 illustrates a side view of a portion indicated by a dotted line in FIG. 1.

The drawings described herein are for illustration purposes only and are not intended to limit the scope of the present disclosure in any way.

DETAILED DESCRIPTION

Hereinafter, various forms of the present disclosure will be described in detail with reference to the accompanying drawings. Specific structures or functions described in various forms of the present disclosure are merely for illustrative purposes. The concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

As illustrated in FIGS. 3 to 7, a vehicle seat support assembly according to one form of the present disclosure includes a front link 5, a front link bracket 14, 24, or 34, and a sagging support.

As described above, one side of the front link 5 is coupled to the front link bracket 14, 24, or 34, and the other side of the front link 5 is coupled to a lower seat frame 3.

The front link bracket 14, 24, or 34 pivotally couples the front link 5. The front link bracket 14, 24, or 34 includes a pivot point PP and rotatably couples the front link 5 with respect to the pivot point PP.

Further, the front link bracket 14, 24, or 34 is coupled to an upper rail 2. In general, the front link 5 may be integrally formed with the upper rail 2 by welding or the like.

According to one form of the present disclosure, the front link bracket 14, 24, or 34 includes a sagging support configured to inhibit sagging of the front link 5 toward the upper rail 2.

Figure 3:
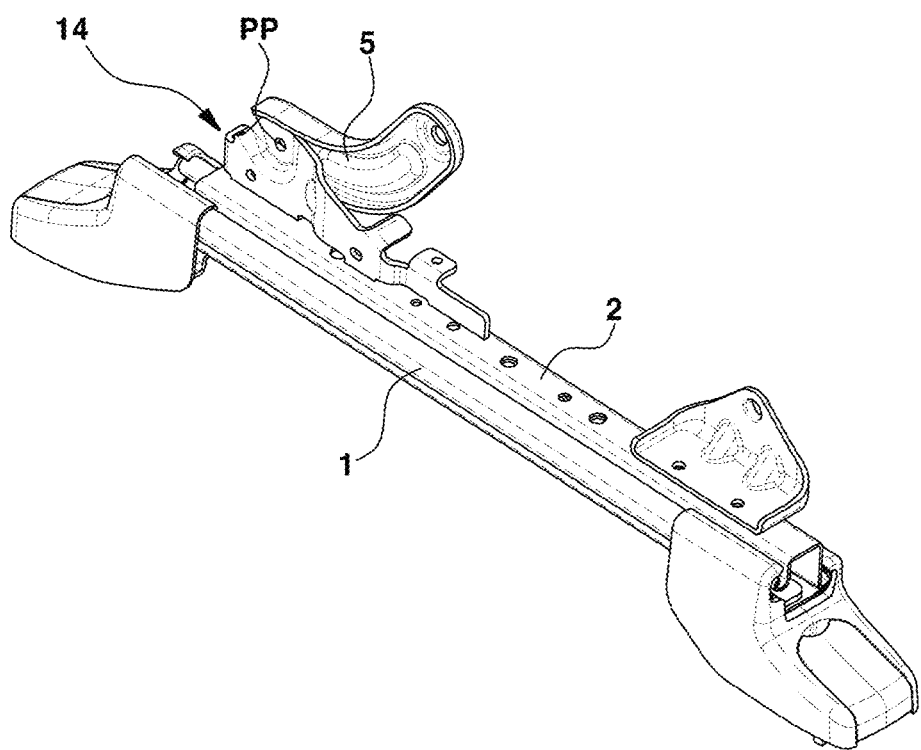
FIG. 3 illustrates a vehicle seat support assembly according to one form of the present disclosure.
Figure 4:
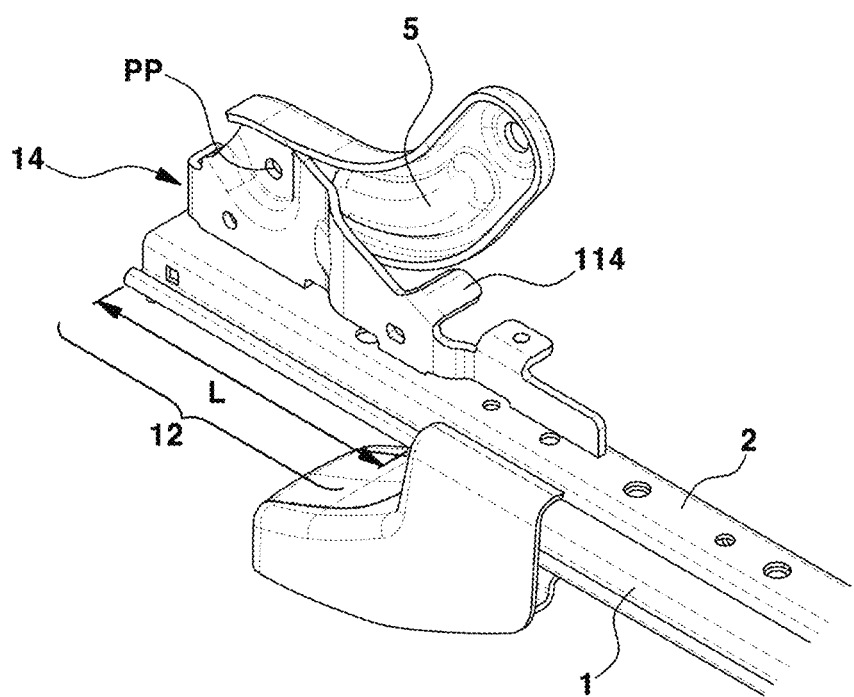
FIG. 4 illustrates a vehicle seat support assembly according to one form of the present disclosure.

Referring to FIGS. 3 and 4, according to one form of the present disclosure, the sagging support includes a protrusion 114. The protrusion 114 protrudes from the front link bracket 14 toward the front link 5. The protrusion 114 protrudes apart from the front link 5 by a predetermined distance. According to one form of the present disclosure, the protrusion 114 is integrally formed with the front link bracket 14. That is, the front link bracket 14 is located on the rotational trajectory of the front link 5 so that sagging of the front link 5 can be reduced during a frontal crash.

Figure 5:
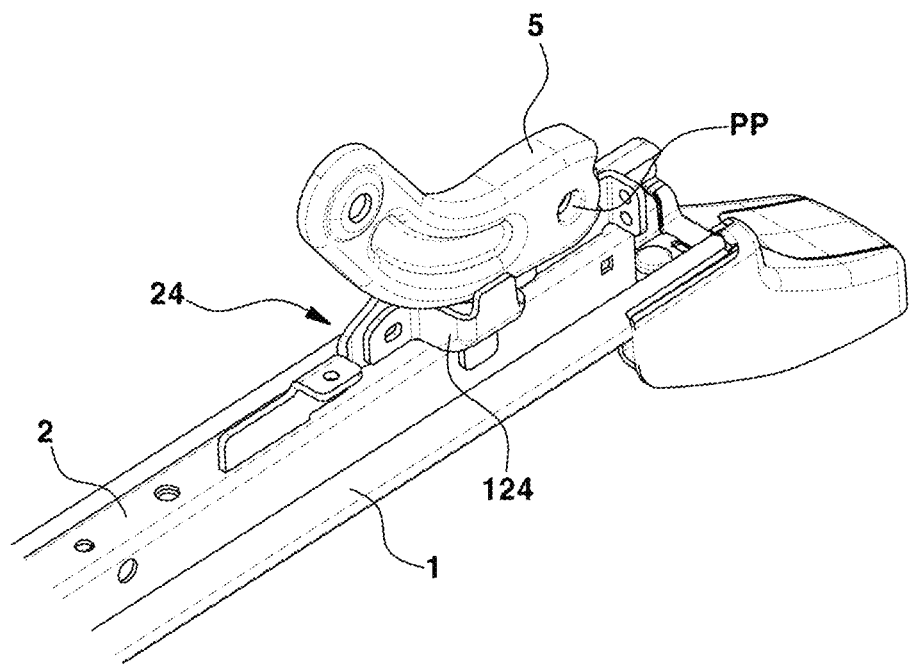
FIG. 5 illustrates a vehicle seat support assembly according to another form of the present disclosure.

As illustrated in FIG. 5, according to another form of the present disclosure, the sagging support includes an auxiliary bracket 124. The auxiliary bracket 124 is coupled to the front link bracket 24 and is disposed to support the front link 5. Specifically, the auxiliary bracket 124 is disposed above the upper rail 2 to support the lower side of the front link 5. The auxiliary bracket 124 is mounted on the side at which the front link bracket 24 and the front link 5 are coupled or on the inner side of the front link bracket 24. According to an exemplary implementation of the present disclosure, the auxiliary bracket 124 is formed in a detachable manner with respect to the front link bracket 24. That is, the separate auxiliary bracket 124 may be mounted by a fastening member, such as bolts and nuts, so that the auxiliary bracket 124 may be detachable from the front link bracket 24.

Being in contact with the upper rail 2, the lower side of the auxiliary bracket 124 is supported by the upper rail 2, and the upper side of the auxiliary bracket 124 is configured to support the front link 5 by contact or the like. According to an exemplary implementation of the present disclosure, when the front link 5 reaches a position where the downward movement of the front link 5 relative to the pivot point PP must be limited, the front link 5 is configured to contact the upper side of the auxiliary bracket 124. Accordingly, it is possible to inhibit the front link 5 from sagging even when a downward force is applied to the front link 5 during a vehicle collision. According to another exemplary implementation of the present disclosure, when the front link 5 reaches a position where a downward movement of the front link 5 relative to the pivot point PP is no longer possible, a predetermined distance may be provided between the front link 5 and the auxiliary bracket 124. In other words, the front link 5 and the auxiliary bracket 124 are first spaced apart a distance so that there is no interference therebetween, and then when the front link 5 reaches a position where no further sag is allowed, the front link 5 can be inhibited from sagging.

Figure 6:
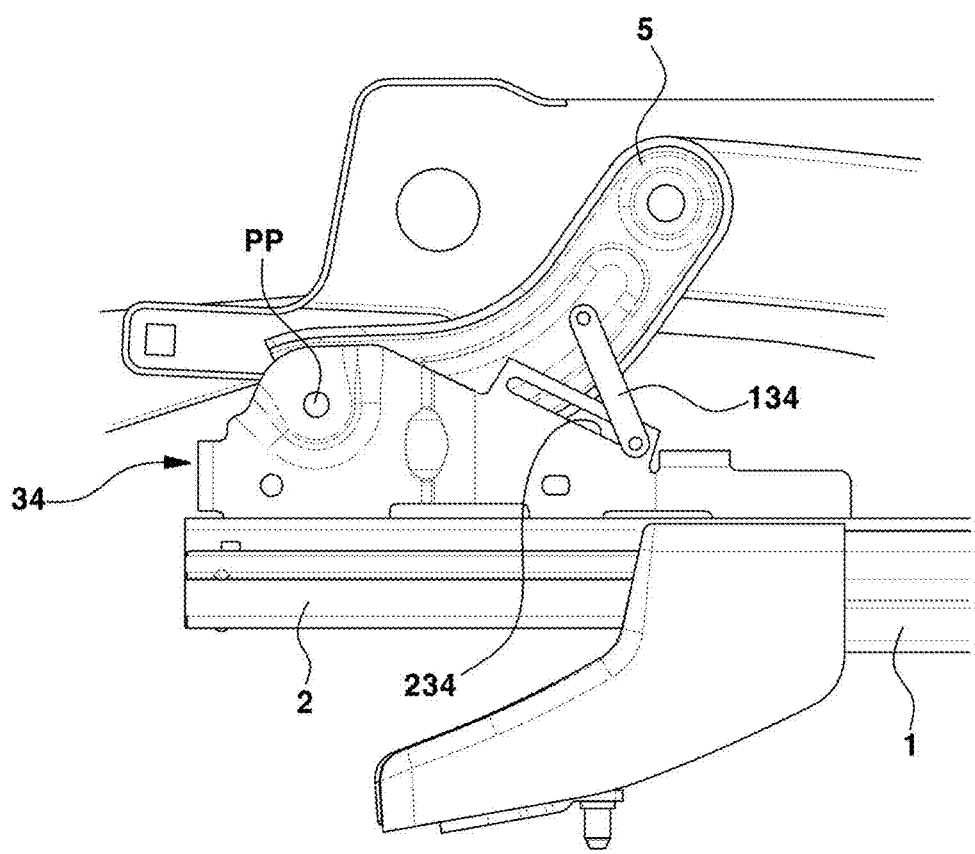
FIGS. 6 and 7 illustrate a vehicle seat support assembly according to another form of the present disclosure.
Figure 7:
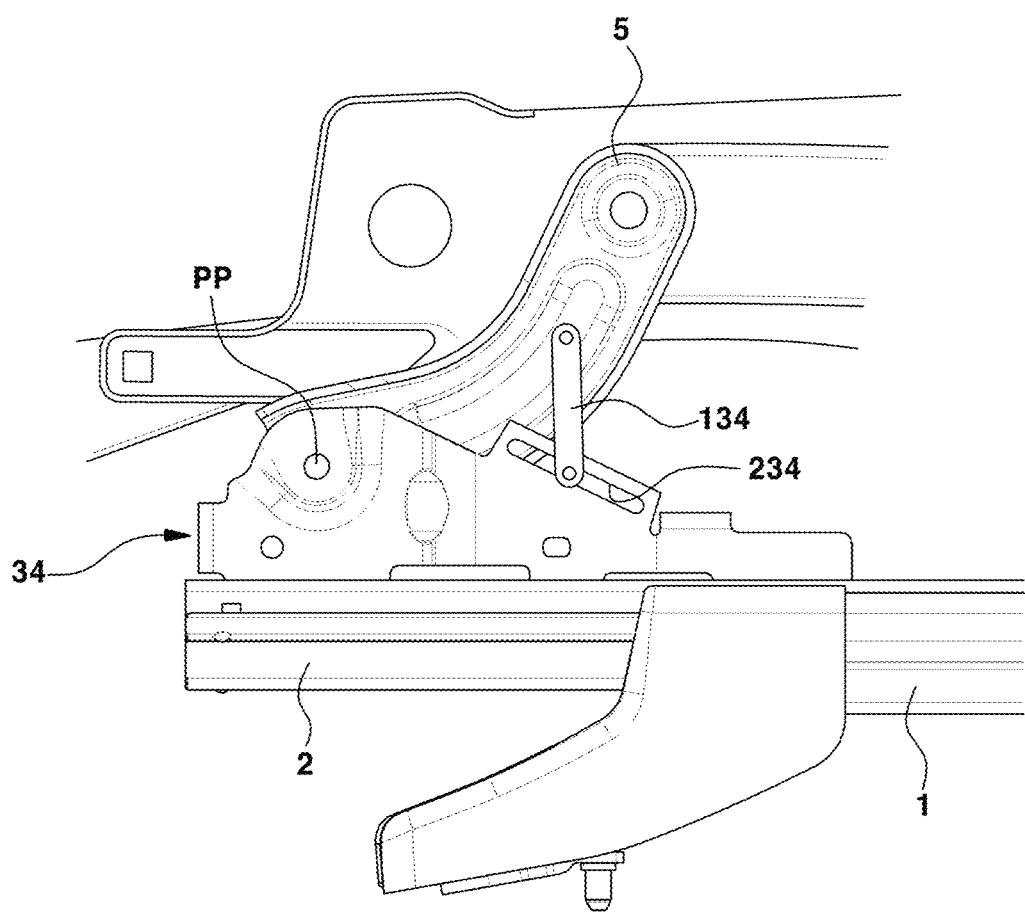

As illustrated in FIGS. 6 and 7, according to another form of the present disclosure, the sagging support includes an auxiliary link 134. One side of the auxiliary link 134 is fixedly coupled to the front link 5, and the other side of the auxiliary link 134 is coupled to a slot-shaped guide that is formed in the front link bracket 134 in the longitudinal direction thereof such that the other side of the auxiliary bracket is movable along the guide portion. To this end, according to an exemplary implementation of the present disclosure, a guide portion 234 is formed in the front link bracket 34. The guide portion 234 is formed through the front link bracket 234 along the substantially longitudinal direction thereof. The other side of the auxiliary link 134 coupled to the guide portion 234 may move along the guide portion 234 when the front link 5 rotates. That is, with the provision of the auxiliary link 134 that can move along with the rotation of the front link 5, it is possible to inhibit sagging of the front link 5 at all times no matter where the front link 5 is located.

Referring again to FIG. 4, according to another form of the present disclosure, the vehicle seat support assembly may include a sagging reinforcement capable of inhibiting sagging of the upper rail 2. The sag reinforcement may avoid sagging of the upper rail 2 when downward force is applied to the upper rail 2 during a vehicle collision or the like.

To this end, according to one form of the present disclosure, the front link bracket 14, 24, or 34 is formed to have a longer length along the upper rail 2 than in the related art. The upper rail 2 is designed so as to be able to protrude only by a predetermined length with respect to the lower rail 1.

That is, a first portion 12, which is a portion where the upper rail 2 is allowed to protrude from the lower rail 1, has a first length L, which is the maximum protruding length, and the length of the front link bracket 14, 24, or 34 along the upper rail 2 is formed to have a length longer than the first length L to provide reinforcing force.

Structural analyses were performed to show results of comparing the amount of sagging of the upper rail 2, i.e., the amount of sagging of the seat cushion, during a frontal crash of a vehicle, according to the present disclosure and the related art.

According to the present disclosure, it can be seen that the force applied to the upper rail 2 was alleviated, and the amount of sagging of the upper rail 2 was greatly reduced. Referring to Table 1 below, it was confirmed that the sagging of the outer side of the seat cushion is particularly larger than the inner side of the seat cushion, and in case of the present disclosure, sagging of approximately 8 mm or more can be inhibited and the amount of forward movement of the dummy is also reduced, relative to the related art configuration.

TABLE 1

| Items | | Related Art | Present Disclosure |
| --- | --- | --- | --- |
| Sagging of Seat Cushion | Inner Side | 30.1 mm | 28.9 mm |
| | Outer Side | 50.0 mm | 41.8 mm |
| Froward Movement of Dummy | | 149.5 mm | 147.6 mm |
| Frame Damage | | None | None |

The vehicle seat support assembly according to the present disclosure can inhibit sagging during a front collision of a vehicle and avoid a submarining phenomenon, while reducing cost by modifying only the structure of the existing front link bracket. Considering that high cost is currently invested in tuning the vehicle body and changing the structure of the lower seat frame and/or suspension in order to inhibit the submarining phenomenon, the present disclosure can provide a certain advantage in terms of cost.

Although various forms of the present disclosure have been described in detail, the scope of the present disclosure is not limited to the above-described forms, and various modifications and changes performed by those skilled in the art using the basic concepts of the present disclosure defined in the following claims are also included in the scope of the present disclosure.

It should be understood that the present disclosure is not limited to the above described forms and the accompanying drawings, and various substitutions, modifications, and alterations can be devised by those skilled in the art without departing from the technical spirit of the present disclosure.

What is claimed is:

1. A vehicle seat support assembly, comprising:
   a front link; and
   a front link bracket coupled to an upper rail of a vehicle seat and including an auxiliary bracket configured to inhibit sagging of the front link toward the upper rail,
   wherein the front link is pivotally coupled to the front link bracket,
   wherein the front link and the auxiliary bracket are directly coupled to a first side of the front link bracket, respectively,
   wherein the auxiliary bracket supports the front link by contacting with the front link when the front link sags,
   wherein the auxiliary bracket is directly detachable from the front link bracket in a state where the front link is coupled to the front link bracket,
   wherein the auxiliary bracket is coupled to an inner portion of the front link bracket, disposed on an upper portion of the upper rail, and configured to support a lower side of the front link, and
   wherein a lower portion of the auxiliary bracket is in contact with and supported by the upper rail, and an upper portion of the auxiliary bracket is configured to support the front link.

2. The vehicle seat support assembly of claim 1, further comprising: a protrusion that extends from the front link bracket toward the front link and is spaced apart from the front link by a predetermined distance.

3. The vehicle seat support assembly of claim 2, wherein the protrusion is formed integrally with the front link bracket.

4. The vehicle seat support assembly of claim 1, wherein when the front link is in a position where a downward pivot movement is limited, the front link is in contact with the upper portion of the auxiliary bracket.

5. The vehicle seat support assembly of claim 1, wherein when the front link is in a position where a downward pivot movement is limited, a predetermined distance is provided between the front link and the auxiliary bracket.

6. The vehicle seat support assembly of claim 1, further comprising: an auxiliary link having a first side fixedly coupled to the front link and a second side movably coupled to the front link bracket.

7. The vehicle seat support assembly of claim 6, wherein a guide portion is formed in the front link bracket, and the second side of the auxiliary link is movably coupled to the guide portion and movable along a longitudinal direction of the front link bracket.

8. A vehicle seat support assembly comprising:
   a lower rail;
   an upper rail slidably mounted on the lower rail and including a first portion that is projected beyond the lower rail by a first length;
   a front link bracket coupled to the first portion and extending along the upper rail for a distance longer than the first length;
   a front link pivotally coupled to the front link bracket; and
   an auxiliary bracket configured to inhibit sagging of the front link toward the upper rail,
   wherein the front link and the auxiliary bracket are directly coupled to a first side of the front link bracket, respectively,
   wherein the auxiliary bracket supports the front link by contacting the front link when the front link sags,
   wherein the auxiliary bracket is directly detachable from the front link bracket in a state where the front link is couple to the front link bracket,
   wherein the auxiliary bracket is coupled to an inner portion of the front link bracket, disposed on an upper portion of the upper rail, and configured to support a lower side of the front link, and
   wherein a lower portion of the auxiliary bracket is in contact with and supported by the upper rail, and an upper portion of the auxiliary bracket is configured to support the front link.

9. The vehicle seat support assembly of claim 8, further comprising any one of:
   a protrusion that extends from the front link bracket toward the front link and is spaced apart from the front link by a predetermined distance;

an auxiliary bracket coupled to the front link bracket and configured to support a lower side of the front link; or an auxiliary link including: a first side fixedly coupled to the front link, and a second side configured to be coupled to and move along the front link bracket.

10. The vehicle seat support assembly of claim 9, wherein the auxiliary link is movably coupled to a longitudinal slot-shaped guide formed in the front link bracket.

\* \* \* \* \*